United States Patent
Abdo

(10) Patent No.: US 10,043,136 B1
(45) Date of Patent: Aug. 7, 2018

(54) REDUCING THE NUMBER OF INPUT LINES TO SUPERCONDUCTING QUANTUM PROCESSORS INSTALLED INSIDE DILUTION REFRIGERATORS

(71) Applicant: INTERNATIONAL BUSINESS MACHINES CORPORATION, Armonk, NY (US)

(72) Inventor: Baleegh Abdo, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/782,544

(22) Filed: Oct. 12, 2017

(51) Int. Cl.
  *F25B 9/12* (2006.01)
  *H04J 1/02* (2006.01)
  *H01B 12/02* (2006.01)
  *G06N 99/00* (2010.01)

(52) U.S. Cl.
  CPC ............ *G06N 99/002* (2013.01); *F25B 9/12* (2013.01); *H04J 1/02* (2013.01); *H01B 12/02* (2013.01)

(58) Field of Classification Search
  CPC ............ G06N 99/002; F25B 9/12; H04J 1/02
  USPC ..................................................... 326/1, 3, 4
  See application file for complete search history.

(56) References Cited

U.S. PATENT DOCUMENTS

| 7,343,059 | B2 | 3/2008 | Beausoleil et al. |
| 8,117,000 | B2 | 2/2012 | DiVincenzo et al. |
| 9,438,246 | B1 | 9/2016 | Naaman |
| 9,735,776 | B1 * | 8/2017 | Abdo ............... H03K 17/92 |
| 9,870,536 | B1 * | 1/2018 | Abdo ............... G06N 99/002 |
| 9,892,365 | B2 * | 2/2018 | Rigetti ............. G06N 99/002 |
| 2008/0048762 | A1 | 2/2008 | Inamdar et al. |
| 2009/0015317 | A1 | 1/2009 | DiVincenzo |
| 2013/0043945 | A1 | 2/2013 | McDermott |
| 2016/0267032 | A1 * | 9/2016 | Rigetti ............. G06N 99/002 |
| 2016/0292587 | A1 | 10/2016 | Rigetti et al. |

FOREIGN PATENT DOCUMENTS

GB   2358932 A   8/2001

OTHER PUBLICATIONS

Baleegh Abdo et al.,"Scalable Qubit Drive and Readout", Related Application, U.S. Appl. No. 15/492,812, filed Apr. 20, 2017.
List of IBM Patents or Patent Applications Treated as Related; (Appendix P), Filed Jan. 2, 2018; pp. 1-2.
Baleegh Abdo, "Microwave Combiner and Distributer for Quantum Signals Using Frequency-Division Multiplexing," Related Application, U.S. Appl. No. 15/275,511, filed Sep. 26, 2016.
R. Barends et al., "Logic gates at the surface code threshold: Superconducting qubits poised for fault-tolerant quantum computing," arXiv preprint arXiv: 1402.4848, 2014.
Yu Chen et al., "Multiplexed dispersive readout of superconducting phase qubits," Applied Physics Letters, vol. 101, No. 18, Nov. 1, 2012.

(Continued)

*Primary Examiner* — Dylan White
(74) *Attorney, Agent, or Firm* — Cantor Colburn LLP; Vazken Alexanian

(57) ABSTRACT

A technique relates to a router. The router includes a qubit signal distributor, a readout signal distributor, and diplexers communicatively coupled to the qubit signal distributor and the readout signal distributor.

25 Claims, 9 Drawing Sheets

(56) References Cited

OTHER PUBLICATIONS

Katarina Cicak et al.,"Low-loss superconducting resonant circuits using vacuum-gap-based microwave components," Applied Physics Letters, vol. 96, Issue 9, Mar. 4, 2010.
List of IBM Patents or Patent Applications Treated as Related; Appendix P, Filed Oct. 12, 2017; pp. 1-2.
PCT/IB2017/057005 International Search Report and Written Opinion, dated Feb. 24, 2018.

* cited by examiner

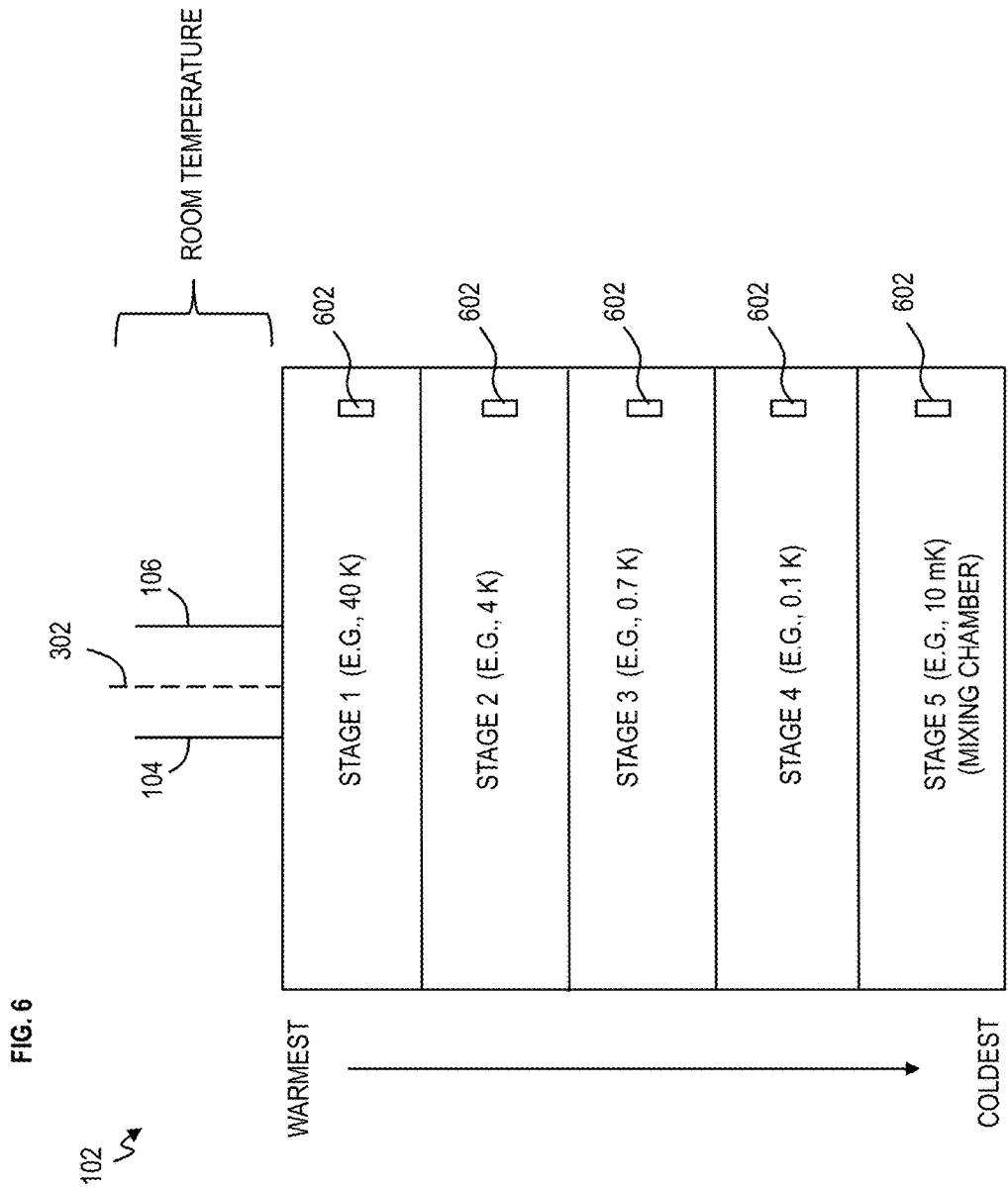

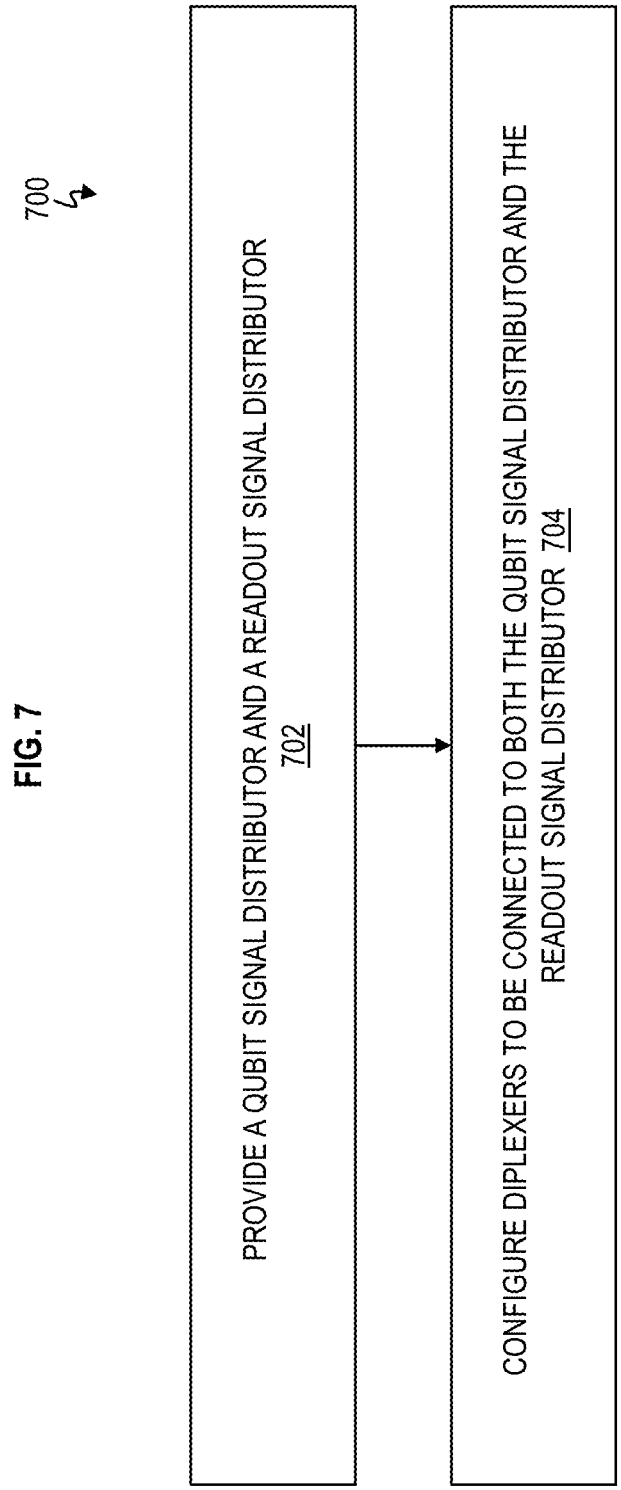

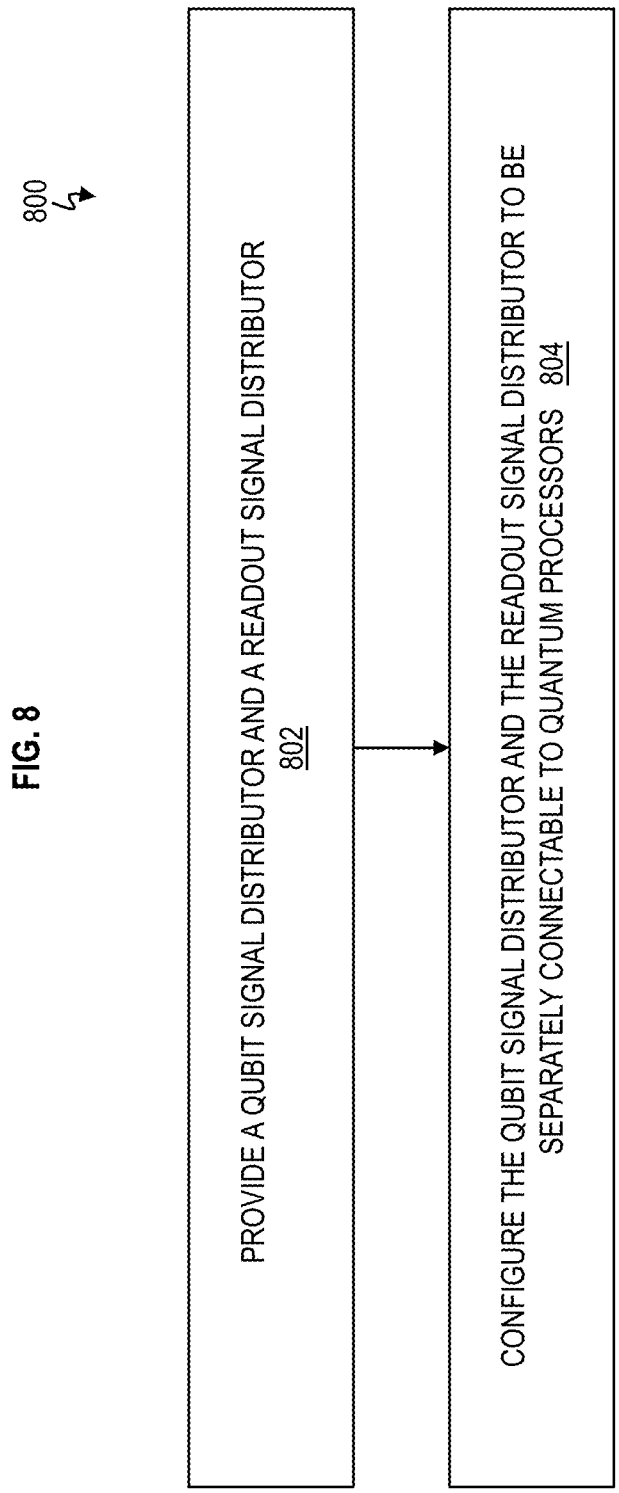

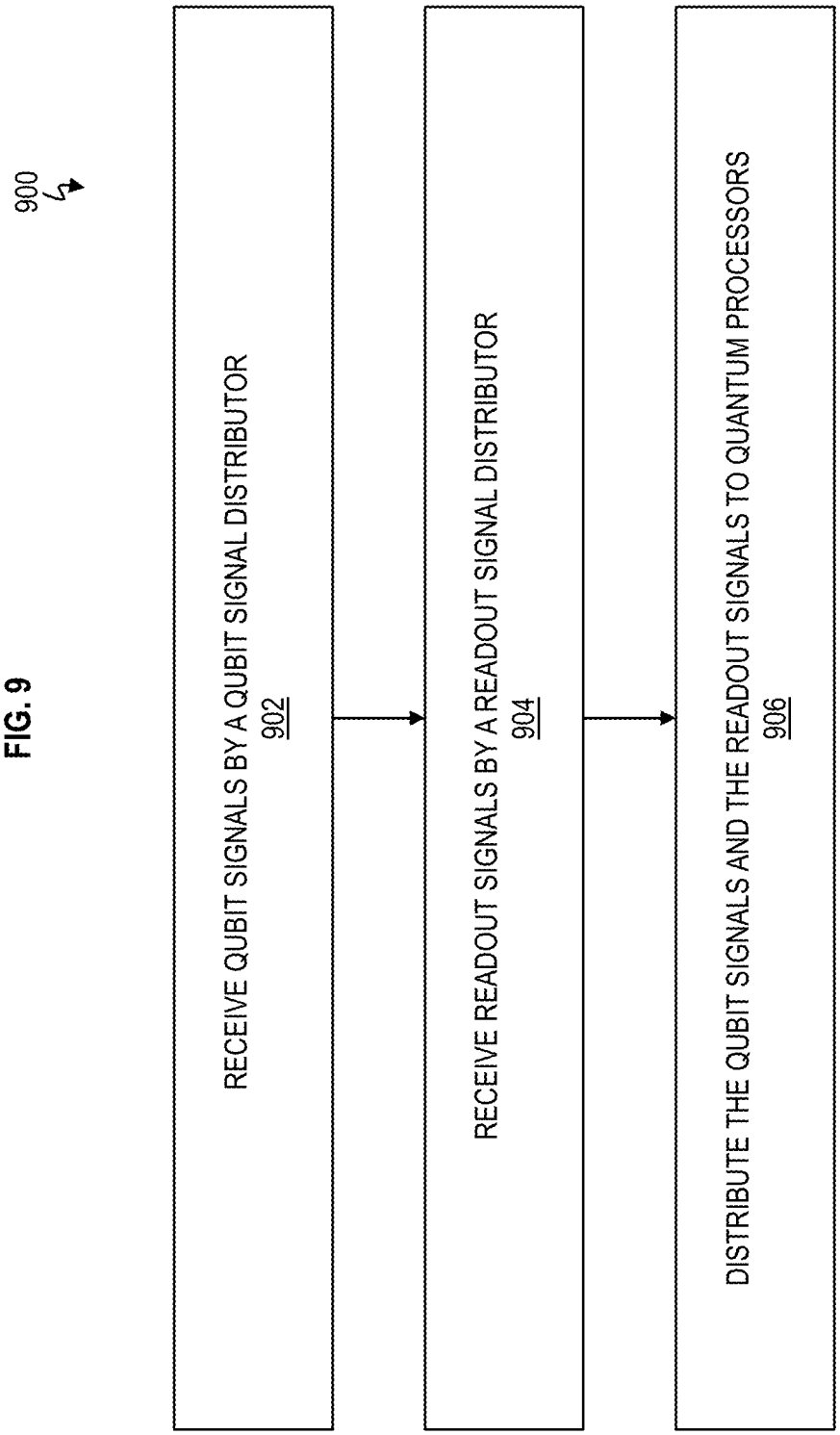

REDUCING THE NUMBER OF INPUT LINES TO SUPERCONDUCTING QUANTUM PROCESSORS INSTALLED INSIDE DILUTION REFRIGERATORS

BACKGROUND

The present invention generally relates to superconducting devices, and more specifically relates to reducing the number of input lines to superconducting quantum processors installed inside dilution refrigerators using frequency-division-multiplexing components.

The phrase "superconducting quantum computing" refers to the use of a quantum computer in superconducting electronic circuits. Quantum computation studies the application of quantum phenomena for information processing and communication. Various models of quantum computation exist, and the most popular models incorporate the concepts of qubits and quantum gates. A qubit can be thought of as a generalization of a bit that has two possible states but can be in a quantum superposition of both states. A quantum gate can be thought of as a generalization of a logic gate in that the quantum gate describes the transformation from their original state that one or more qubits will experience after the gate is applied on them. The physical implementation of qubits and gates can be difficult to implement, for the same reasons that quantum phenomena are hard to observe in everyday life. One approach is to implement the quantum computers in superconductors where the quantum effects become macroscopic, though at a price of extremely low operation temperatures.

Superconducting quantum computer are typically designed to work in the microwave frequency range, cooled down in dilution refrigerators below 100 milliKelvin (mK), and communicated with (e.g., addressed with) using conventional electronic instruments. Typical dimensions of qubits are on the scale of micrometers, with sub-micrometer resolution, and allow a convenient design of a quantum Hamiltonian (which is an operator corresponding to the total energy of the system) with the well-established integrated circuit technology. An example of a dilution refrigerator that can be used in the above-described cooling process is a 3He/4He dilution refrigerator, which is a cryogenic device that provides continuous cooling to temperatures as low as 2 mK, with no moving parts in the low-temperature region. The cooling power is provided by the heat of mixing the Helium-3 and Helium-4 isotopes. It could be considered the only continuous refrigeration method for reaching temperatures below 0.3 K. Modern dilution refrigerators can precool the 3He with a cryocooler in place of liquid nitrogen, liquid helium, and a 1 K bath. No external supply of cryogenic liquids is needed in these "dry cryostats" and operation can be highly automated. Dry dilution refrigerators generally follow one of two designs. One design incorporates an inner vacuum can, which is used to initially precool the machine from room temperature down to the base temperature of the pulse tube cooler (using heat-exchange gas). However, every time the refrigerator is cooled down, a vacuum seal that holds at cryogenic temperatures needs to be made, and a low temperature vacuum feed-through must be used for the experimental wiring. The other design is more demanding to realize because it requires heat switches for precooling. However, the other design does not require an inner vacuum can, which greatly reduces the complexity of the experimental wiring.

SUMMARY

Embodiments of the present invention are directed to router. A non-limiting example of the router includes a qubit signal distributor, a readout signal distributor, and diplexers communicatively coupled to the qubit signal distributor and the readout signal distributor.

Embodiments of the present invention are directed to a method of configuring a router. A non-limiting example of the method of configuring the router includes providing a qubit signal distributor and a readout signal distributor, and configuring diplexers to be communicatively coupled to the qubit signal distributor and the readout signal distributor.

Embodiments of the present invention are directed to a router. A non-limiting example of the router includes a qubit signal distributor, and a readout signal distributor. The qubit signal distributor and the readout signal distributor are each communicatively coupled to respective quantum processors.

Embodiments of the present invention are directed to method of configuring a router. A non-limiting example of the method of configuring the router includes providing a qubit signal distributor and a readout signal distributor, and configuring the qubit signal distributor and the readout signal distributor to be separately connectable to respective quantum processors.

Embodiments of the present invention are directed to a method for a router. A non-limiting example of the method for a router includes receiving qubit signals by a qubit signal distributor, receiving readout signals by a readout signal distributor, and distributing the qubit signals and the readout signals to quantum processors.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a diagram of a dilution refrigerator according to embodiments of the present invention;

FIG. 7 depicts a flow chart of a method of configuring a router according to embodiments of the present invention;

FIG. 8 depicts a flow chart of a method of configuring a router according to embodiments of the present invention; and FIG. 9 depicts a flow chart of a method for a router according to embodiments of the present invention.

Figure 1:
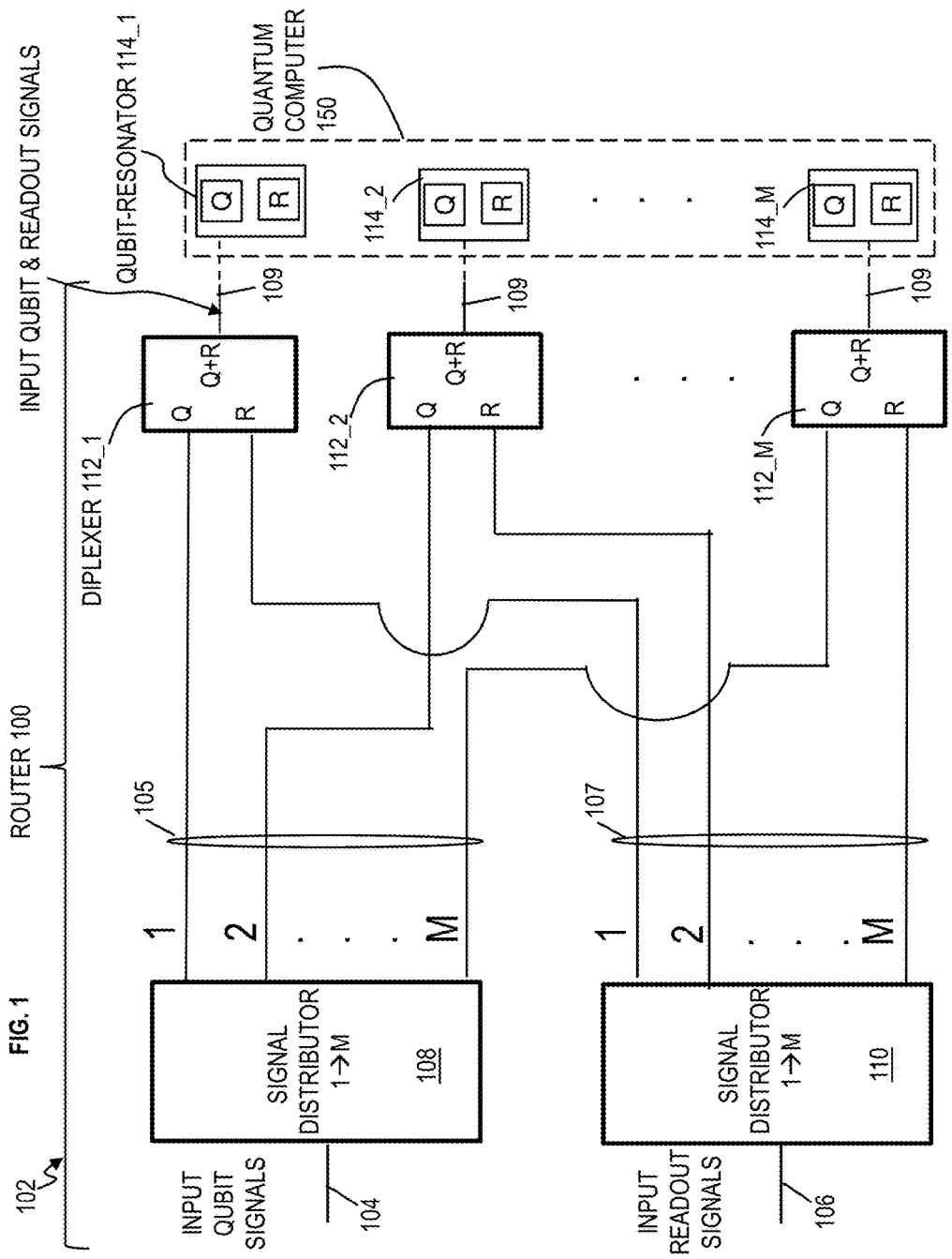
FIG. 1 depicts a schematic of a router or a routing architecture according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor and/or superconducting devices and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor and/or superconducting devices and semiconductor/superconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, in the state-of-the-art for N qubit-readout resonators in a superconducting quantum processor, there are N input lines carrying readout signals and qubit drives in one case, or 2N input lines, where N input lines connect to the N resonators and another N input lines connect to the N qubits. As the number of qubit-readout resonators in a superconducting quantum processor N increases, the following undesired effects occur: 1) increase in the amount of microwave components that are needed, 2) increase in the volume occupied by these input lines inside the dilution refrigerator, 3) increase in the amount of noise entering the refrigerator from room-temperature stage, 4) increase in the weight hanging on the dilution refrigerator stages, 5) increase in the thermal load on the dilution refrigerator (requiring more cooling power), and/or 6) increase in the cost (e.g., physical, financial, technical) of the components and lines.

Turning now to an overview of the aspects of the invention, one or more embodiments of the invention address the above-described shortcomings of the prior art by providing a mechanism to reduce the number of input lines and microwave components inside a dilution refrigerator that are used to feed superconducting quantum processors. A router and method are provided that reduce input lines to qubits and input lines to readout resonators of the quantum processors according to embodiments of the present invention. The router uses passive microwave devices because no control lines are needed, reduces the number of input lines and the noise entering the dilution refrigerator from room temperature, reduces the number of microwave components used on the input lines where the components on the input lines include attenuators, filters, and infrared filters. As additional technical benefits, the router also improves thermalization by requiring less cooling power, and combines the readout and qubit signals at the quantum processor stage, thus allowing the separate optimization of the input lines of the readout and qubit signals. Further, the router provides modularity, because the scheme can be extended without modification to the existing lines. Also, faulty components can be replaced without affecting the quantum processor chip. Different frequency-division-multiplexing (FDM) components can be designed and implemented depending on the resultant qubit frequencies in the quantum processor. The router includes a very low-loss distribution and addition of signals. The router can be fabricated on chip using superconducting circuits, which do not use any Josephson junctions, and does not require changes to the architecture of quantum processors.

Figure 2:
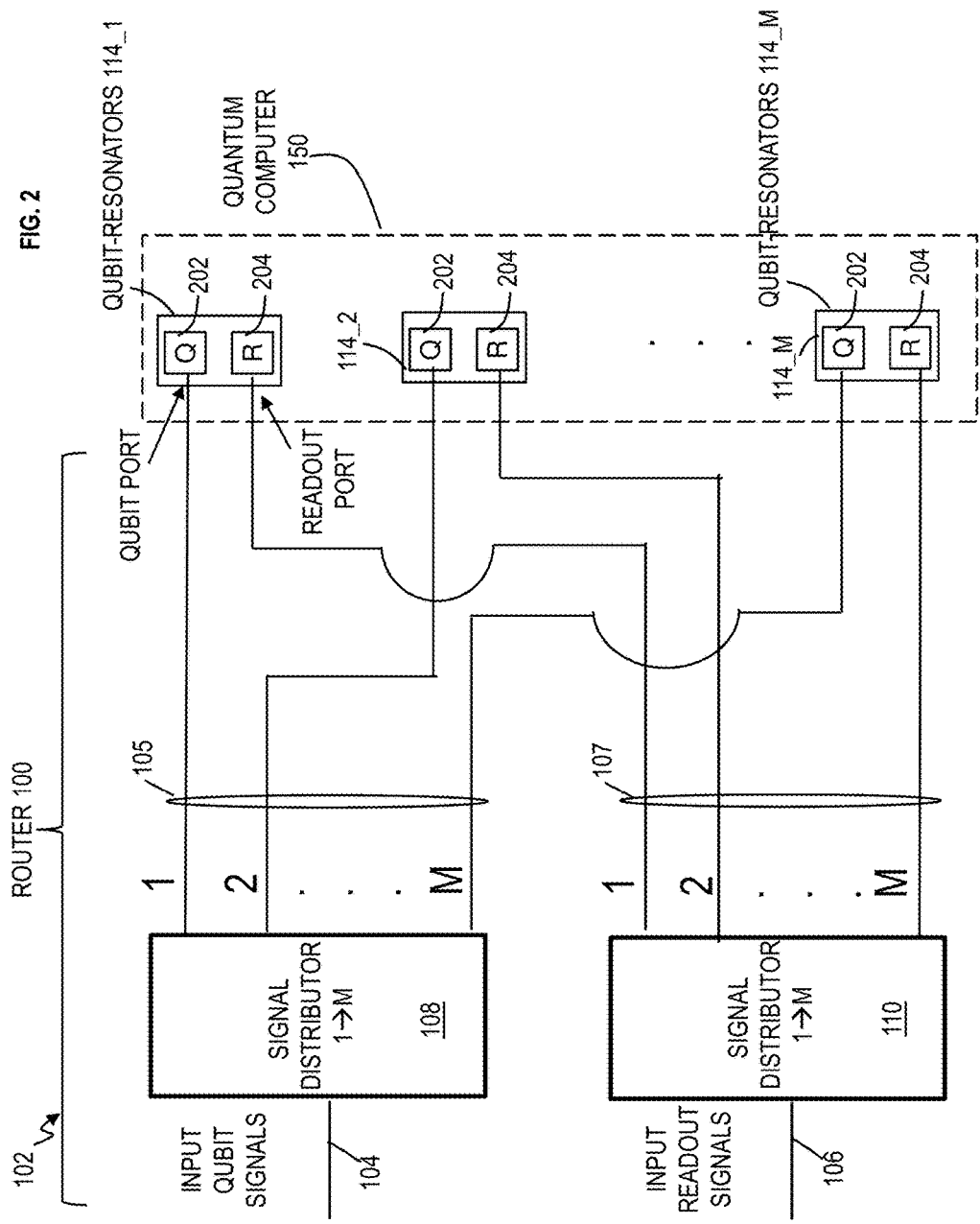
FIG. 2 depicts a schematic of a router or a routing architecture according to embodiments of the present invention.

More specifically, the above-described aspects of the invention address the shortcomings of the prior art by providing a router or a routing architecture (depicted in FIGS. 1, 2, and 3) that is configured to separate the input lines feeding superconducting quantum computers into two sets of input lines, one set carrying qubit pulses/drives, and another set carrying readout pulses/tones. The routing architecture is configured to connect 1 input-M output signal distributer, which employs frequency-division-multiplexing, to each input line of each set of input lines at the mixing chamber or at a higher stage in the dilution refrigerator prior to the input of the superconducting quantum processor. The 1 input-M output signal distributers separate M different microwave signals having M different frequencies entering the input of the signal distributer into M different physical ports at the output of the signal distributer. If the qubits share the same feedlines or ports as their readout resonators, for each qubit and readout resonator, the router is configured to combine the designated readout signal and drive signal and then input the combined signal to its shared feedline or port by using a 2 input-1 output diplexer (as depicted in FIG. 1). The diplexer is capable of combining these disparate signals (readout and qubit drive) onto the same transmission line (feeding the readout-qubit system). If the qubits have separate feedlines from the readout resonators (as depicted in FIG. 2), the router connects the feedlines of the qubits to the designated outputs of the signal distributer carrying their designated qubit drives and connect the feedlines of the readout resonators to the designated outputs of the signal distributer carrying their readout signals.

Figure 3:
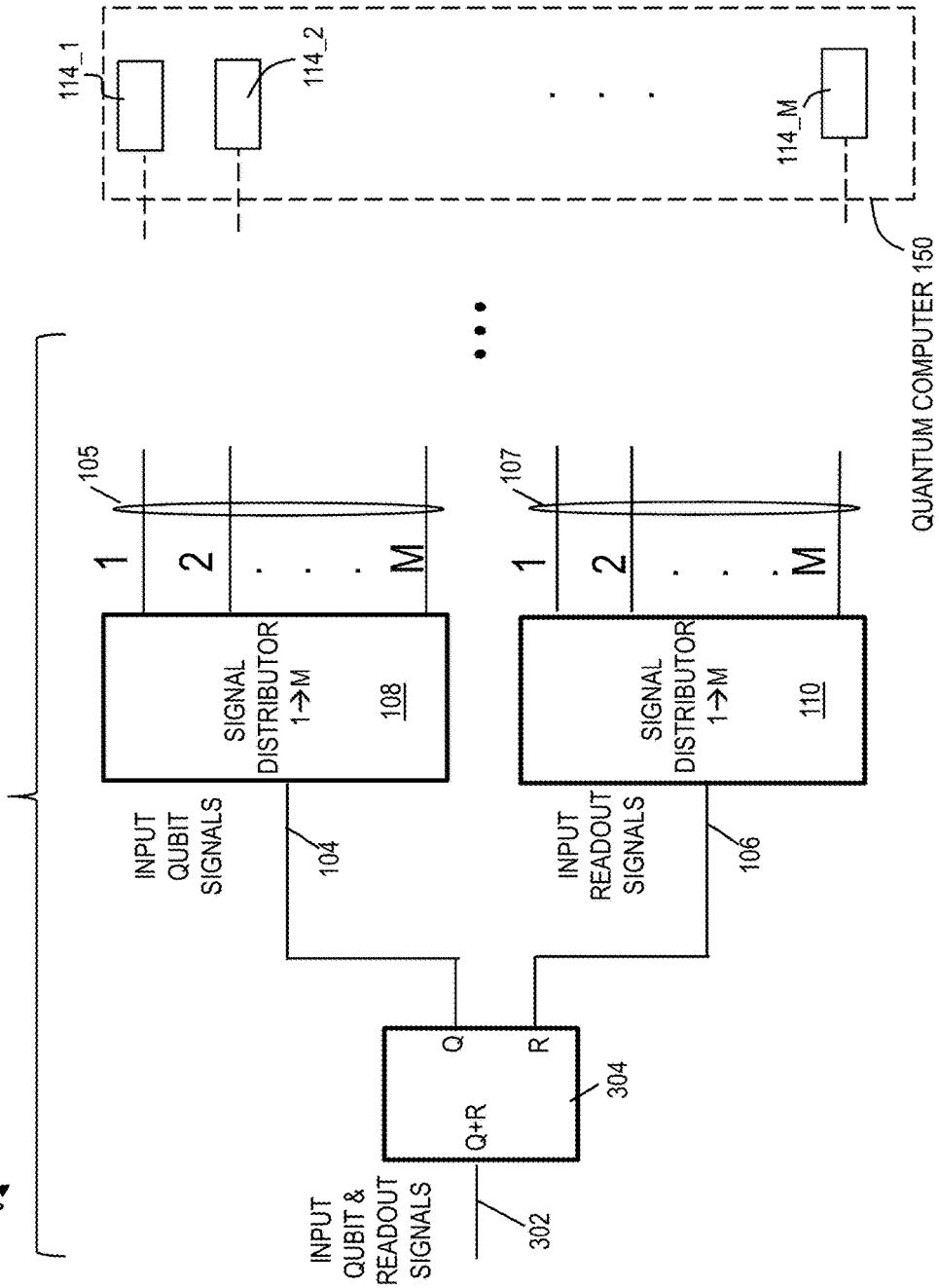
FIG. 3 depicts a schematic of a router or a routing architecture according to embodiments of the present invention.

Further, the router can be configured to use one set of input lines that enter the refrigerator from room-temperature, which carry both readout signals and qubit drives. The router is configured to separate the readout signals and qubit drives carried on each input line at a certain stage in the dilution refrigerator such as, for example, the 4 K stage using a wideband diplexer, which covers the spectrum of the readout and drive tones (as depicted in FIG. 3). The router can be connected to two separate input lines for the qubit drives and readout tones down to the mixing chamber (e.g., stage 5) or a higher stage such the 100 mK stage or still higher. The router can split the readout tones and drive signals carried by the two internally (inside the dilution refrigerator) separate input lines, and then combine the readout tones and drive signals (prior to the input to the superconducting quantum processor).

Turning now to a more detailed description of aspects of the present invention, FIG. 1 depicts a schematic diagram of a router or routing architecture 100 according to embodiments of the invention. The routing architecture 100 is depicted as having two signal distributors 108 and 110 in this example. The signal distributor 108 has its input connected to qubit input line 104 for receiving input qubit signals and its output connected to narrowband diplexers 112. The signal distributor 110 has its input port connected to input line 106 for receiving input readout signals and its output port connected to diplexers 112. The respective diplexers 112 are each connected to a quantum system, such as qubit-resonator systems 114. The signal distributor 108, 110, diplexers 112 can, and the be formed with superconductor materials and/or low-loss materials. The routing architecture 100 has input lines 104 and 106 that are installed into (or part of) a dilution refrigerator 102 components of the router 100 are in the dilution refrigerator 102.

The two signal distributors 108 and 110 are shown as each having one input port and M output ports (1→M). Although one qubit signal distributor 108 is shown and one readout resonator signal distributor 110 is shown, there can be multiples pairs of each. That is, the qubit signal distributor 108 and readout resonator signal distributor 110 are utilized as a pair. Accordingly, for a given router with one input port and M output ports, there can be 2 qubit signal distributors 108 and 2 readout resonator signal distributors 110 (for 2 pairs) connected to the quantum processor, there can be 3 qubit signal distributors 108 and 3 readout resonator signal distributors 110 (for 3 pairs) connected to the quantum processor, 4 pairs, 10 pairs, 50 pairs, hundreds of pairs, thousands of pairs, etc.

The signal distributor 108 is configured to receive a combination of input qubit signals on input line 104 at its input port and transport individual qubit signals on lines 105 (from output ports 1-M) to separate diplexers 112_1 through 112_M. The combination of input qubit signals can be a first qubit signal through a last qubit signal each at different frequencies. For example, the first qubit signal at first qubit frequency is $f_{Q1}$, the second qubit signal at second qubit frequency is $f_{Q2}$, through the last qubit frequency at last qubit frequency $f_{QM}$. It is assumed that $f_{Q1} < f_{Q2} < f_{Q3} \ldots < f_{QM}$. The signal distributor 108 distributes the combination of input qubit signals received on the input port to different output ports 1-M, based on their respective qubit frequency. For example, the signal distributor 108 is configured to transmit (from port 1) the first qubit signal at the first qubit frequency $f_{Q1}$ to the low frequency input, which is designated with a Q, of diplexer 112_1. Similarly, the second qubit signal at the second qubit frequency $f_{Q2}$ is transmitted (from port 2 of the qubit signal distributor 108) to the low frequency input Q of diplexer 112_2. The last qubit frequency at last qubit frequency $f_{QM}$ is transmitted (from port M of the qubit signal distributor 108) to the low frequency input Q of diplexer 112_M.

Analogous to the signal distributor 108, the signal distributor 110 is configured to receive a combination of input readout signals on input line 106 at its (single) input port and transport individual readout signals on lines 107 (from output ports 1-M) to separate diplexers 112_1 through 112_M. The combination of input readout signals can be a first readout signal through a last readout signal each at different frequencies. For example, the first readout signal at first readout frequency is $f_{R1}$, the second readout signal at second readout frequency is $f_{R2}$, and the last readout frequency at last readout frequency is $f_{RM}$. It is assumed that $f_{R1} < f_{R2} < f_{R3} \ldots < f_{RM}$. The signal distributor 110 distributes the combination of input readout signals received on the input port to different output ports 1-M, based on their respective readout frequency. For example, the signal distributor 110 is configured to transmit (from output port 1) the first readout signal at the first readout frequency $f_{R1}$ to the high frequency input, which is designated with an R, of diplexer 112_1. Similarly, the second readout signal at the second readout frequency $f_{R2}$ is transmitted (from output port 2 of the readout signal distributor 110) to the high frequency input R of diplexer 112_2. The last readout frequency at last qubit frequency $f_{QM}$ is transmitted (from output port M of the readout signal distributor 110) to the high frequency input R of diplexer 112_M.

The diplexers 112_1 through 112_M are each configured to combine the qubit signal received at the low frequency input (Q) with the respective readout signal received at the high frequency input (R). For example, at low frequency port Q, diplexer 112_1 receives the first qubit signal at the first qubit frequency $f_{Q1}$ from port 1 of the signal distributor 108, and at high frequency port R, the diplexer 112_1 receives the first readout signal at the first readout frequency $f_{R1}$ from port 1 of the signal distributor 110. The diplexer 112_1 combines the signals received at ports Q and R and outputs a combined qubit signal and readout signal on port Q+R to a qubit-resonator 114_1 of quantum computer 150. The qubit-resonators 114_1 through 114_M are all together an individual quantum processor. The qubit-resonators 114 each include a qubit such as qubit 202 and a readout resonator such as resonator 204 shown in FIG. 2.

Similarly, at low frequency port Q, diplexer 112_2 receives the second qubit signal at the second qubit frequency $f_{Q2}$ from output port 2 of the signal distributor 108, and at high frequency port R, the diplexer 112_2 receives the second readout signal at the second readout frequency $f_{R2}$ from output port 2 of the signal distributor 110. The diplexer 112_2 combines the signals received at ports Q and R and outputs a combined qubit signal and readout signal on port Q+R to the qubit-resonator 114_2 of quantum computer 150. Likewise, at low frequency port Q, diplexer 112_M receives the last qubit signal at the last qubit frequency $f_{QM}$ from output port M of the signal distributor 108, and at high frequency port R, the diplexer 112_M receives the last readout signal at the last readout frequency $f_{RM}$ from output port M of the signal distributor 110. The diplexer 112_M combines the signals received at ports Q and R and outputs a combined qubit signal and readout signal on port Q+R to the qubit-resonator 114_M of quantum computer 150.

The router 100 is in the dilution refrigerator 102, while the input lines 104 and 106 are the only two lines connecting to the router 100 from inside of the refrigerator 102. The router 100 includes signal distributors 108 and 110 (one for distributing the qubit signals and one for distributing the readout signals), transmission lines 105 and 107, and diplexers 112_1 through 112_M. Transmission lines 109 connect the diplexers 112 to the respective qubit-resonators 114.

In FIG. 1, it is assumed that each qubit-resonator 114_1 through 114_M has a single line and single port for receiving both the input qubit and the readout resonator signals. In other words, each qubit-resonator 114_1 through 114_M receives its input qubit signal and input readout signal on the same port/line. In some quantum computers/processors, the ports of the qubit and readout resonator are separate, such that the input qubit signal is received on a separate line and port from the input readout resonator signal.

FIG. 2 depicts a schematic of the router 100 according to embodiments of the present invention. The router 100 in FIG. 2 has a slightly different configuration than depicted in FIG. 1. Particularly, the router 100 in FIG. 2 does not utilize the diplexers 112_1 through 112_M because the qubit-resonators 114_1 through 114_M have a separate port for each qubit 202 and each readout resonator 204. As such, the qubit and readout signals do not need to be combined to a single port using diplexers 112 before being sent to the qubit resonators 114 in FIG. 2. Accordingly, FIG. 2 illustrates that the router 100 can be utilized for quantum computer 150 having a separate ports and input lines for the qubits 202 and readout resonators 204 of qubit-resonators 114_1 through 114_M.

In FIG. 2, the two signal distributors 108 and 110 are shown as each having one input port and M output ports (1→M), and the signal distributor 108 is configured to receive a combination of input qubit signals on input line 104 at its input port and transport individual qubit signals on lines 105 to separate qubits ports on qubit-resonator 114_1 through 114_M. As discussed above, the combination of input qubit signals can be a first qubit signal through a last qubit signal each at different frequencies. The first qubit signal at first qubit frequency is $f_{Q1}$, the second qubit signal at second qubit frequency is $f_{Q2}$, through the last qubit frequency at last qubit frequency $f_{QM}$, and it is assumed that $f_{Q1} < f_{Q2} < f_{Q3} \ldots < f_{QM}$. Again, the signal distributor 108 distributes the combination of input qubit signals received on the input port to different output ports 1 -M, based on their respective qubit frequency. However, unlike FIG. 1, the signal distributor 108 is configured to transmit (from output port 1) the first qubit signal at the first qubit frequency $f_{Q1}$ via the separate qubit port (directly) to the qubit 202 of qubit-resonator 114_1. As can be seen, no diplexers 112 are required in FIG. 2 because the qubit 202 and readout resonator 204 have separate input ports which are connected to separate input lines. Similarly, the second qubit signal at the second qubit frequency $f_{Q2}$ is transmitted (from output port 2 of the qubit signal distributor 108) via the separate qubit port (directly) to the qubit 202 of qubit-resonator 114_2. The last qubit frequency at last qubit frequency $f_{QM}$ is transmitted (from output port M of the qubit signal distributor 108) via the separate qubit port (directly) to the qubit 202 of qubit-resonator 114_M.

Analogous to the signal distributor 108, the signal distributor 110 is configured to receive a combination of input readout signals on input line 106 at its (single) input port and transport individual readout signals on lines 107 to separate ports of readout resonators of qubit-resonator 114_1 through 114_M. The combination of input readout signals can be a first readout signal through a last readout signal each at different frequencies. As noted above, the first readout signal at first readout frequency is $f_{R1}$, the second readout signal at second readout frequency is $f_{R2}$, through the last readout frequency at last readout frequency $f_{RM}$, and $f_{R1} < f_{R2} < f_{R3} \ldots < f_{RM}$. Again, the signal distributor 110 distributes the combination of input readout signals received on the input port to different output ports 1-M, based on their respective readout frequency. However, unlike FIG. 1, the signal distributor 110 is configured to transmit (from output port 1) the first readout signal at the first readout frequency $f_{R1}$ via the separate readout port (directly) to the readout resonator 204 of qubit-resonator 114_1. Similarly, the second readout signal at the second readout frequency $f_{R2}$ is transmitted (from output port 2 of the signal distributor 110) via the separate readout port (directly) to the readout resonator 204 of qubit-resonator 114_2. The last readout frequency at last qubit frequency $f_{QM}$ is transmitted (from output port M of the signal distributor 110) via the separate readout port (directly) to the readout resonator 204 of qubit-resonator 114_M.

FIG. 3 depicts a schematic of the router 100 according to embodiments of the present invention. FIG. 3 can utilize the configuration of the router 100 in FIGS. 1 and 2. As such, some details of the router 100 have been omitted in FIG. 3 but can be found in FIGS. 1 and 2.

FIG. 3 depicts an example in which a single input line 302 is inside the dilution refrigerator 102 and connects to the router or router architecture 100 within the dilution refrigerator 102. The single input line 302 (simultaneously) carries both the input qubit signals ($f_{Q1}$, $f_{Q2}$, $f_{Q3}$, . . . $f_{QM}$) and input readout signals ($f_{R1}$, $f_{R2}$, $f_{R3}$, . . . $f_{RM}$) instead of two separate input lines 104 and 106 inside the dilution refrigerator 102.

The single input line 302 connects to a wideband diplexer 304 at the sum port (Q+R). This is a wideband diplexer 304 which means that the diplexer 304 has a frequency band that encompasses all of the qubit frequencies for all of the qubits in the quantum processor 150 and encompasses all of the readout resonator frequencies for all of the readout resonators in the quantum processor 150 (here for simplicity, it is assumed that there are M qubits in the processor). The low frequency port, again designated Q, of the wideband diplexer 304 is connected to the single input port of the signal distributor 108 via transmission line 104. The high frequency port, again designated R, of the wideband diplexer 304 is connected to the single input port of the signal distributor 110 via transmission line 106. Although omitted for simplicity and so as not to obscure FIG. 3, the signal distributors 108 and 110 are connected to the qubit-resonators 114 of quantum computer 150 in a manner depicted in FIGS. 1 and 2.

An example of operating the router 100 in FIG. 3 is discussed below. At the sum input port Q+R, the wideband diplexer 304 is configured to receive on input line 302 the first qubit signal at the first qubit frequency $f_{Q1}$, the second qubit signal at the second qubit frequency $f_{Q2}$, through the last qubit signal at the last qubit frequency $f_{QM}$ and receive the first readout signal at the first readout frequency $f_{R1}$, the second readout signal at the second readout frequency $f_{R2}$, through the last readout frequency $f_{RM}$. In this example, the qubit frequencies are less than the readout frequencies such as, for example, $f_{Q1}$, $f_{Q2}$, $f_{Q3}$, . . . $f_{QM} < f_{R1}$, $f_{R2}$, $f_{R3}$, . . . $f_{RM}$. Accordingly, the wideband diplexer 304 is configured to output on the low frequency output Q all input qubit signals at qubit frequencies $f_{Q1}$, $f_{Q2}$, $f_{Q3}$, . . . $f_{QM}$. The wideband diplexer 304 is configured to output on the low frequency output R all input readout signals at readout frequencies $f_{R1}$, $f_{R2}$, $f_{R3}$, . . . $f_{RM}$.

The (qubit) signal distributor 108 is configured to receive the first through last qubit signals respectively at qubit frequencies $f_{Q1}$, $f_{Q2}$, $f_{Q3}$, . . . $f_{QM}$ on qubit input line 104. Likewise, the (readout) signal distributor 110 is configured to receive the first through last readout signal respectively at readout frequencies $f_{R1}$, $f_{R2}$, $f_{R3}$, . . . $f_{RM}$ on readout resonator line 106. Now, that the signal distributor 108 and the signal distributor 110 have respectively received the input qubit signals and the input readout signals, the operation of the router 100 continues the same as discussed above in FIG. 1 or 2, and therefore is not repeated.

Figure 4:
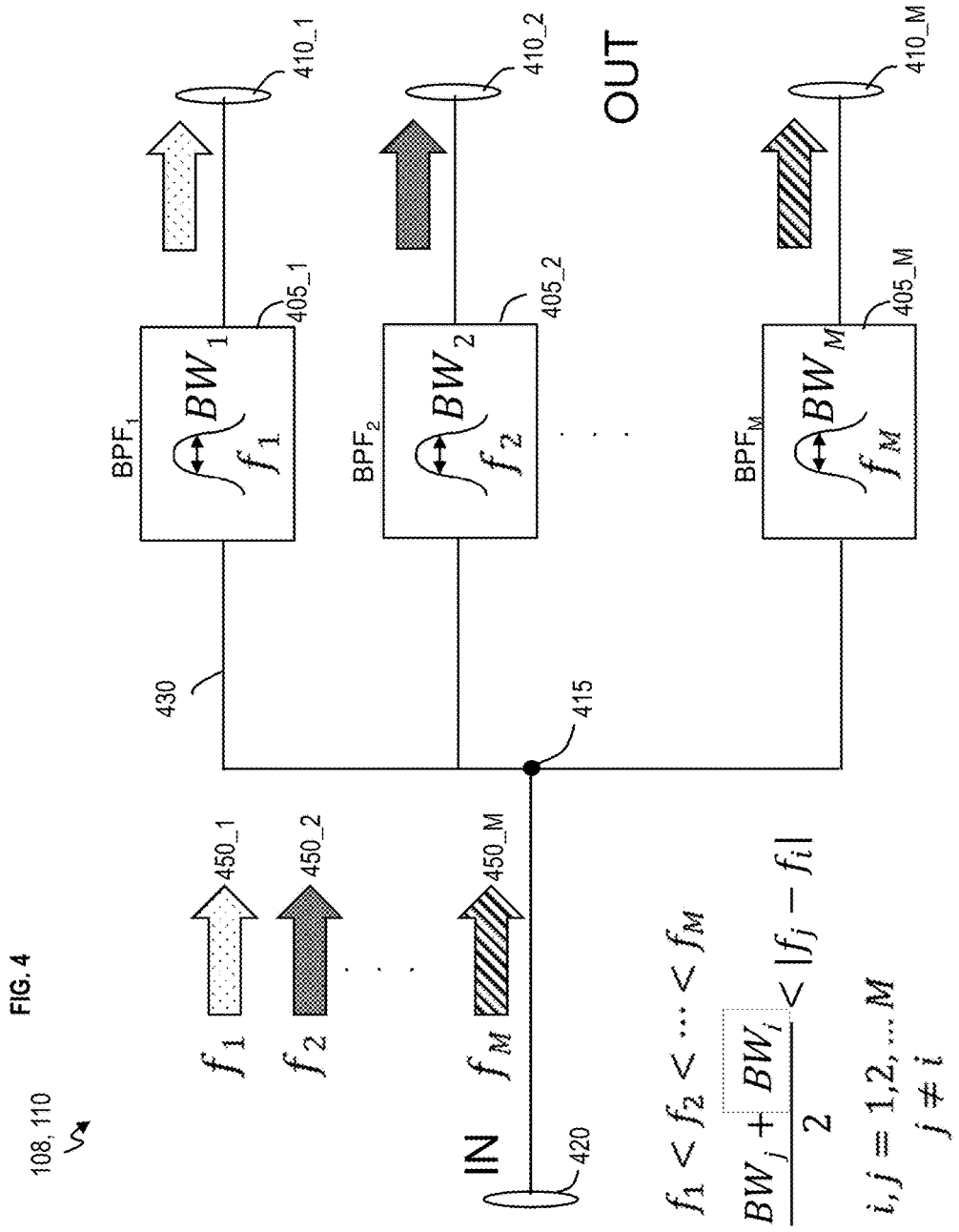
FIG. 4 depicts a schematic of a signal distributor/combiner according to embodiments of the present invention.

FIG. 4 depicts a schematic of the signal distributor/combiner 108, 110 according to embodiments of the present invention. The signal distributor 108, 110 is configured to utilize frequency-division multiplexing to distribute microwave signals 450_1 through 450_N input on the common port 120 to individual ports 1 through M, in which the microwave signals 450_1 through 450_M are directed/distributed according to the passband of the respective bandpass filter 405_1 through 405_M. For explanation purposes, the microwave signals 450_1 through 450_M represent generic signals which can apply to both the signal distributor 108 and the signal distributor 110, and the microwave signals 450_1 through 450_M (having respective frequencies $f_1, f_2, f_3, \ldots f_M$) can represent qubit signals at qubit $f_{Q1}, f_{Q2}, f_{Q3}, \ldots f_{QM}$ and/or readout signals at readout frequencies $f_{R1}, f_{R2}, f_{R3}, \ldots f_{RM}$.

In FIG. 4, the signal distributor 108, 110 includes bandpass microwave filters generally referred to as bandpass filters 405. The different bandpass filters 405 are depicted as bandpass filters 405_1 through bandpass filters 405_N. Each bandpass filter 405 has a different narrow passband through which microwave signals having a frequency in the particular narrow passband are transmitted (i.e., passed) and signals having a frequency outside of the particular narrow passband are reflected (i.e., blocked). The bandpass filter 405_1 has its own narrow passband with a bandwidth 1 ($BW_1$), bandpass filter 405_2 has its own narrow passband with a bandwidth 2 ($BW_2$) through bandpass filter 405_M has its own narrow passband with a bandwidth N ($BW_M$).

For example, bandpass filter 405_1 is configured with a passband (frequency band) that permits a microwave signal 450_1 having frequency $f_1$ to pass (transmit) through but blocks (reflects) all other microwave signals 450_2 through 450_M having frequencies $f_2$ through $f_M$ which are outside of the passband for bandpass filter 405_1. Similarly, bandpass filter 405_2 is configured with a passband (frequency band) that permits a microwave signal 450_2 having frequency $f_2$ to pass (transmit) through but blocks (reflects) all other microwave signals 450_1, 450_3 through 450_M having frequencies $f_1, f_3$ through $f_M$ which are outside of the passband for bandpass filter 405_2. Analogously, bandpass filter 405_M is configured with a passband (frequency band) that permits a microwave signal 450_M having frequency $f_M$ to pass (transmit) through but blocks (reflects) all other microwave signals 450_1 through 450_M−1 having frequencies $f_1$ through $f_{M-1}$ which are outside of the passband for bandpass filter 405_M. The microwave signals 450_1 through 450_N are generally referred to as microwave signals 450. When cavity-qubit quantum systems are operatively connected to the signal distributor 108, 110, the microwave signals 450 can be at respective frequencies $f_1$ through $f_M$ designated to drive particular qubits or designated to readout qubit (via readout resonators or cavities), as understood by one skilled in the art.

The signal distributor 108, 110 includes ports 410 individually connected to respective bandpass filters 405. Particularly, the different ports 410 are designated as port 410_1, port 410_2 through port 410_M, where M represents the last of the ports 410. Similarly, M represents the last of the frequencies, microwave signals 450, bandpass filters 405, and so forth. The ports 410_1 through 410_M generically can represent output ports 1-M in FIGS. 1-3. In the signal distributor 108, 110, port 410_1 is connected to bandpass filter 405_1, port 410_2 is connected to bandpass filter 405_2, and port 410_M is connected to bandpass filter 405_M. Each port 410_1 through port 410_M is connected to one end of its own bandpass filter 405_1 through bandpass filter 405_M. The other end of the bandpass filter 405_1 through bandpass filter 405_M is connected to a common port 420 via a common node 415. The common node 415 can be a common connection point, a common transmission line, a common wire, etc., as a mutual location for electrical connection. The common port 420 connects to each bandpass filter 405_1 through bandpass filter 405_M, while the individual ports 410 are connected (only) to their respective bandpass filter 405_1 through bandpass filter 405_M.

Because the bandpass filters 405_1 through 405_M only transmit respective microwave signals 450_1 through 450_M in the respective passband, the signal distributor 108, 110 is configured such that each bandpass filter 405_1 through bandpass filter 405_M covers a different band (or sub-band) of frequencies, such that none of the passbands (of the bandpass filters 405) are overlapping. Accordingly, each port 410_1, port 410_2, through port 410_M is isolated from one another because of being connected to its respective bandpass filter 405_1 through 405_M, such that no microwave signal 450 through any one port 410 (whether entering or exiting) leaks into another port 410 via the common node 415. As such, each port 410 is isolated from other ports 410 and is designed to transmit its own microwave signal 450 at a predefined frequency (or within a predefined frequency band), as a result of being connected to its own bandpass filter 405.

The respective ports 410, bandpass filters 405, common node 415, and common port 420 are connected to one another via transmission lines 430. The transmission line 430 can be a stripline, microstrip, coplanar waveguide, etc. The microwave bandpass filters 405 are designed and implemented using lossless or low-loss lumped elements such as superconducting resonators, superconducting inductors, superconducting gap capacitors and/or plate capacitors, and passive superconducting elements. The superconducting elements include lumped-element inductors, gap capacitors, and/or plate capacitors (with low loss dielectrics). Other possible implementations of the bandpass filters include coupled-line filters, and/or capacitively-coupled series resonators.

The respective ports 410, bandpass filters 405, common node 415, common port 420, and transmission lines 430 are made of superconducting materials. Additionally, all of the materials of the router 100 (in FIGS. 1, 2, 3, 4, and 5) can be made of superconducting materials and/or low loss materials. Examples of superconducting materials (at low temperatures, such as about 10-100 millikelvin (mK), or about 4 K) include niobium, aluminum, tantalum, etc.

The signal distributor 108, 110 is configured with the frequency relation $f_1 < f_2 < \ldots < f_M$, where each frequency $f_1, f_2, \ldots f_M$ is the center frequency of the bandpass filters 405_1 through 405_M, respectively. The signal distributor 108, 110 is configured such that it satisfies the inequality $$\frac{BW_j + BW_i}{2} < |f_j - f_i|$$

where i,j=1, 2, . . . M and j≠i. This inequality requires that the frequency spacing between the center frequencies $f_i$ and $f_j$ of each pair of bandpass filters exceeds their average bandwidths. In other words, the inequality ensures that none of the bandpass filters have overlapping bandwidths (i.e., frequency range).

In one implementation of the signal distributor 108, 110, a coaxial cable can connect to the external ends of the common port 420 such that the coaxial cable connected to the common port 420 inputs the microwave signals 450_1 through 450_M at different frequencies $f_1$ through $f_M$ while other coaxial cables connected to output ports 410 output the individual microwave signals 450_1 through 450_M. Instead of a coaxial cable, a stripline, microstrip, wire, etc., can be used. For each microwave signal 450_1 through 450_N at its respective frequency $f_1$ through $f_M$, only individual frequencies $f_1$ through $f_M$ are permitted to pass through the respective bandpass filters 405_1 through 405_M having a passband covering the corresponding frequency $f_1$ through $f_M$, thus passing through individual port 410_1 through port 410_M. Because each of the bandpass filters 405_1 through 405_M has no overlapping passband, each microwave signal 450_1 through 450_M has its own frequency $f_1$ through $f_M$ predefined to only pass through one of the bandpass filters 405_1 through 405_M. The microwave signals 450 at its own one of the frequencies $f_1$ through $f_M$ are input through the common port 420, and each microwave signal 450_1 through 450_M passes through the common node 415, is transmitted through its respective bandpass filter 405_1 through 405_M, and exits through individual ports 410_1-M according to frequency $f_1$ through $f_M$. Each port 410_1-M (only) outputs its own respective frequency $f_1$ through $f_M$ because of the filtering by the respective bandpass filters 405_1 through 405_M. In other words, port 410_1 outputs microwave signal 450_1 at frequency $f_1$ (via bandpass filter 405_1), while bandpass filter 405_1 blocks frequencies $f_2$-$f_M$. Port 410_2 outputs microwave signal 450_2 at frequency $f_2$ (via bandpass filter 405_2), while bandpass filter 405_2 blocks frequencies $f_1$, $f_3$-$f_M$. Similarly, port 410_M outputs microwave signal 450_M at frequency $f_M$ (via bandpass filter 405_M), while bandpass filter 405_M blocks frequencies $f_1$-$f_{M-1}$.

Figure 5:
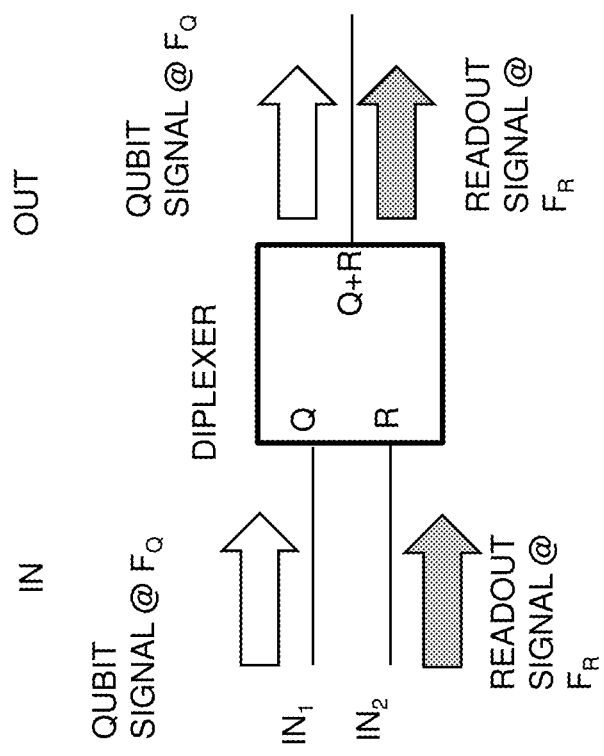
FIG. 5 depicts a schematic of frequency-division-multiplexing diplexers according to embodiments of the present invention.

FIG. 5 depicts a schematic of example frequency-division-multiplexing diplexers 112, 304 according to embodiments of the present invention. The diplexer 112, 304 is a three-port microwave device that is frequency selective. The diplexer can combine at the output port input signals with different frequencies entering the input ports, and vice versa. In general, the qubit frequencies ($f_{Q1}$, $f_{Q2}$, $f_{Q3}$, ... $f_{QM}$) lie, for example, in the band 3-5.5 GHz, and the readout frequencies ($f_{Q1}$, $f_{Q2}$, $f_{Q3}$, ... $f_{QM}$) lie, for example, in the band 6.5-10 GHz. By using a diplexer 112, 304 that has one input port (Q) which passes signals in the band 3-5.5 GHz, another input port (R) which passes signals in the band 6.5-10 GHz, and one output port Q+R, also called common, that combines signals that lie within these two frequency bands. In an analogous fashion, it is noted the diplexer 304 separates the signals in FIG. 3. Each diplexer 112_1 through 112_M can be designed and optimized separately depending on the qubit and readout signals it combines. Alternatively, all diplexers 112_1 through 112_M can be designed to be identical with frequency bands for the qubit and readout ports which cover all qubit frequencies in use and all readout frequencies in use respectively.

In the case all diplexers are semi-identical, the Q side of the diplexer 112, 304, can include a low-pass filter (LPF) with a cutoff frequency that is larger than the maximum qubit frequency in use, and/or bandpass filter whose center frequency matches the average qubit frequency. The R side of the diplexer 112, 304 can include a high-pass filter (HPF) with a cutoff frequency that is smaller than the minimum readout frequency in use, and/or bandpass filter whose center frequency matches the average readout frequency.

FIG. 6 depicts a diagram of an example dilution refrigerator 102 according to embodiments of the present invention. This example shows the dilution refrigerator 102 with five stages, where stage 1 is the warmest and stage 5 is the coldest. It should be appreciated that more or fewer stages can be utilized. As an example, the stage 1 can be about 40 K, stage 2 about 4 K, stage 3 about 0.7 K, stage 4 about 0.1 K, and stage 5 about 10 mK. Stage 5 is also referred to as the mixing chamber. It should be appreciated that these temperatures are only example values. For example, stage 5 could be 4 mK, 10 mK, 15 mK, 20 mK, etc.

In one implementation, the dilution refrigerator 102 can have two input lines 104 and 106 (one for qubit signals and one for readout signals) entering or inside the dilution refrigerator 102 that extend from the room temperature stage (on top of the dilution fridge) as depicted in FIGS. 1 and 2, and another implementation can have one input line 302 (concurrently for both qubit signals and readout signals) entering or inside the dilution refrigerator 102 that extends from the room temperature stage (on top of the dilution fridge) as depicted in FIG. 3. A dashed line 302 is illustrated to represent the example option for the router 100 with the diplexer 304 as depicted in FIG. 3. The two solid lines 104 and 106 are illustrated as entering the dilution refrigerator 102 from room temperature to represent the router 100 when the diplexer 304 is not present.

Stage 5 of the dilution refrigerator 102 is where the superconducting qubits are positioned, i.e., the quantum computer 150 having the qubit-resonators 114_1 through 114_M are in the stage 5. It should be noted that if all the components of the router/routing architecture (e.g., components 108, 110, 105, 107, 112_1-M) presented in FIGS. 1, 2, 3 are located at stage 5 and they are combined into one device, either implemented on chip or joined together as part of an integrated circuit, then this combined device can be referred to as a router. However, if certain parts such as the signal distributors 108, 110 are located at a higher stage, e.g., 4 K (stage 2), whereas the diplexers 112_1 through 112_M of FIG. 1 are located at stage 5 (0.01 K), then due to the physical separation between the components and the presence of intermediate components such as, attenuators and coaxial-line sections at the different stages, it is more appropriate to refer to the circuit diagrams of FIGS. 1, 2, 3 as routing architectures.

It is noted that attenuators, represented as attenuators 602, are on the input line (e.g., qubit input line 104 and readout resonator input line 106, or the combined qubit and readout resonator input line 302) at each stage in the dilution refrigerator 102. Other microwave components can be added. The input lines (whether qubit input line 104 and readout resonator input line 106, or the combined qubit and readout resonator input line 302) run in the dilution refrigerator 102 to eventually couple to the superconducting quantum computer 150, as would be understood by one skilled in the art.

It should be appreciated that embodiments of the present invention reduce the undesired effects discussed herein by reducing the number of input lines and microwave components inside a dilution refrigerator, which are used to feed superconducting quantum processors. For example, by using 1 input-M output (1→M) signal distributers 108, 110 on the set of readout input lines 106 and the set of qubit input lines 104, the total number of input lines in the scheme is $$2\left(\left\lceil \frac{N}{M} \right\rceil\right),$$

where N is the number qubits in the quantum processor/quantum computer 150 which need to be driven. In some of the examples utilized above it was assumed that N=M, where M is the number of output ports/lines from the signal distributors 108, 110. When N=M, there can be a router 100 in which only 1 signal distributor 108 is needed for the qubit input line 104 and 1 signal distributor 110 is needed for the readout input line 106. However, there can be cases in which N is greater than M. In some cases, there can be more total qubits (N) than there are outputs M of the signal distributor 108, 110. As a numerical example, it is assumed that N=1000, M=7 for 2(⌈1000/7⌉), and the total number of input lines would be 2*(143)=286. Accordingly, there will be 143 input lines for the readout set and 143 input line for the qubit set, which means there are 143 pairs of input lines 104 and 106. Similarly, the total number of qubit signal distributors 108 would be 143 and the total number of readout signal distributors 110 would be 143, which means there will be 143 pairs of signal distributors 108 and 110 each having 1 input port and M=7 output ports. The brackets $$\left\lceil \frac{N}{M} \right\rceil$$

indicate that the solution of the fraction is rounded up to the next whole number (i.e., the next integer). As such, 142.857 was rounded up to 143, because there is no fraction of an input line and no fraction of a signal distributor (even though all output ports M may or may not be utilized). It should be noted that the factor 2 that appears in the above calculations refers to the fact that there are separate input lines for the qubit drives and the readout tones as shown in FIGS. 1 and 2.

As another numerical example, N=100 and M=5, such that the total number of input lines would be 2*20=40. Accordingly, there will be 20 readout input lines for the readout set and 20 qubit input lines for the qubit set, which means there will be 20 pairs of input lines 104 and 106. Similarly, the total number of qubit signal distributors 108 would be 20 and the total number of readout signal distributors 110 would be 20, which means there will be 20 pairs of signal distributors 108 and 110 each having 1 input port and M=5 output ports.

The state-of-the art would require more input lines externally entering the dilution refrigerator 102 than embodiments of the invention. The state-of-the-art requires an input line for each qubit in the quantum processor and an input line for each readout resonator in the quantum processor (when they have separate ports), such that these input lines externally enter the dilution refrigerator, pass through the different stages, to reach the quantum processor. As understood by the skilled in the art, these input lines consist of different sections at different stages, and are connected to different attenuators and filters at the different stages. The different sections of the input lines are needed in order to thermally isolate the stages in the dilution fridge and also provide good thermal anchoring of the lines to the different stages. As such, if there are 1000 qubits, then 1000 qubit input lines are needed in the state-of-the-art. Similarly, an additional 1000 readout resonator lines are needed if the qubit and readout resonator have separate ports in the quantum processor in the state-of-the-art.

Further, it is noted that the router 100 does not use any control lines or control signals. Particularly, the router 100 uses (only) passive microwave components. The router 100 allows optimization of the attenuation and components installed on the readout input line set and the qubit input line set separately. As noted above, the router 100 reduces the number of input lines and the noise entering the dilution refrigerator 102 from room temperature, and reduces the number of microwave components used on the input lines where the components on the input lines include attenuators, filters, and infrared filters. For example, if each input line has six sections at the different stages in the dilution fridge as shown in FIG. 6, i.e., room temperature (top of the fridge), 40 K (stage 1), 4 K (stage 2), 0.7 K (stage 3), 0.1 K (stage 4), 0.01 K (stage 5), and if each section, except the room temperature one, connects to a fixed attenuator, then embodiments can have 6 cable sections and five attenuators per input line. Therefore, by reducing the number of input lines, embodiments of the invention are effectively cutting the number of cable sections and attenuators used. Also, it is worth noting that by eliminating a large number of these components (by reducing the number of input lines), embodiments of the invention reduce the weight carried by the fridge, reduce the cost of wiring the fridge, and reduce the thermal mass inside the fridge that needs to be cooled down (thus reducing the needed cooling power of the fridge or allowing more input lines to be installed for the same cooling power).

Additionally, the setup of the router 100 provides options for which stage/stages the router 100 (i.e., its components) can be placed in. As one option, the router 100 is placed in stage 5 of the dilution refrigerator 102, which can be considered the most optimum location. In stage 5, the router 100 is closest to the quantum processor 150. Accordingly, two input lines 104 and 106 (assuming N=M) or one input line 302 (even if N>M) passes through stages 1-5, in order to reach the router 100 in stage 5. If 1 input line 302 is feeding the router 100 from outside of the dilution refrigerator 102, this requires 1×5=5 attenuators. If 2 input lines 104 and 106 are feeding the router 100 from outside of the dilution refrigerator 102, this requires 2×5=10 attenuators. By having the router 100 in stage 5, this means that the qubit signal distributors 108 are in stage 5 and the readout signal distributors 110 are in stage 5.

As other options, the router 100 can be placed in stage 1, 2, 3, and/or 4. In other words, the signal distributors 108, 110, diplexers 112 (if used), and diplexer 304 (if used) can collectively and/or individually be placed in stages 1, 2, 3, 4, and/or 5. In one implementation, the diplexer 304 could be placed in a warmer stage than the other components (such as signal distributors 108, 110, diplexers 112).

Further, the router 100 can be implemented as an integrated circuit on a chip, a printed circuit board, etc. and the chip/printed circuit board can be placed in the desired stage, such as stage 5.

It should be noted that the input scheme discussed herein can be similarly applied to other microwave input lines for superconducting quantum computers, such as pump lines feeding quantum-limited Josephson amplifiers or other microwave-based control lines.

There are various types of quantum processors. It should be appreciated that embodiments of the present invention can be used to feed quantum processors that uses the surface code architecture (as a platform for running the surface code error correction algorithm) or any different error-correcting architectures. With respect to surface code architecture, the main requirement is that the architecture uses cQED (circuit quantum electrodynamics) building blocks, and that the qubit and readout signals are fed to each qubit-readout system using the same feedline (the latter is optional). Another requirement is that qubit frequencies are distinguishable or lie within M or more distinct frequency bands. There can be a situation in which the quantum gate used in the quantum processor is based on (or a variation of) the cross-resonance gate, in which qubits can either receive qubit signals that have frequencies at either their qubit resonance or the neighboring qubits resonance (where neighboring qubits are qubits that are coupled together through a bus/coupler and can be subject to a cross-resonance gate); in this case, it is possible, using this scalability scheme of the router 100, to match between the feedlines of neighboring qubits and different signal distributors in order to provide one-to-one mapping between the qubit signal and the designated qubit. The following is an example of using/configuring the router 100 for use with a quantum computer 150 having surface code architecture and using cross-resonance gates. 1) Neighboring qubits in a unit cell of the surface code can be designed to have qubit frequencies that lie within one of five distinct frequency bands, such as 4-4.2 GHz, 4.3-4.5 GHz, 4.6-4.8 GHz, 4.9-5.1 GHz, 5.2-5.4 GHz. 2) The signal distributors on the qubit lines, have 5 output physical ports, each transmitting qubit signals that lie within one of these bands, i.e., first output transmits in the band 4-4.2 GHz, second output transmits in the band 4.3-4.5 GHz, third output transmits in the band 4.6-4.8 GHz, fourth port transmits in the band 4.9-5.1 GHz, and fifth port transmits in the band 5.2-5.4 GHz. Then, the output ports of each signal distributor connect to non-neighboring qubits in different unit cells based on their common band.

The circuit elements of the router 100 and connected to the router 100 can be made of superconducting material. The respective resonators and transmission/feed/pump lines are made of superconducting materials or very low loss normal metals such as, copper, silver, gold, etc. The hybrid couplers can be made of superconducting materials. Examples of superconducting materials (at low temperatures, such as about 10-100 millikelvin (mK), or about 4 K) include niobium, aluminum, tantalum, etc. For example, the Josephson junctions are made of superconducting material, and their tunnel junctions can be made of a thin tunnel barrier, such as an oxide. The capacitors can be made of superconducting material separated by low-loss dielectric material. The transmission lines (i.e., wires) connecting the various elements are made of a superconducting material or very low loss normal metals such as, copper, silver, gold, etc.

FIG. 7 depicts a flow chart 700 of method of configuring a router 100 according to embodiments of the present invention. At block 702, one or more qubit signal distributors 108 (one qubit signal distributor 108 is illustrated but there can be multiple qubit signal distributors 108) and one or more readout signal distributors 110 (one readout signal distributor 110 is illustrated but there can be multiple readout signal distributors 110) are provided. At block 704, diplexers 112_1 through 112_M are configured to be connected to both the (one or more) qubit signal distributor 108 and the (one or more) readout signal distributor 110, as depicted in FIG. 1.

The qubit signal distributor 108 is configured to connect to a qubit input line 104. The readout signal distributor 110 is configured to connect to a readout input line 106.

The diplexers 112_1 through 112_M are configured to connect the qubit signal distributor 108 and the readout signal distributor 110 to quantum processors 150. The qubit signal distributor 108 and the readout signal distributor 110 require fewer qubit input and readout input lines 104, 106 compared to connecting to quantum processors without the qubit signal and readout signal distributors.

A wideband diplexer 304 is configured to be connected to an input side of the qubit signal distributor 108 and the readout signal distributor 110, as depicted in FIG. 3. The wideband diplexer 304 is configured to connect to a combination qubit input and readout input line 107.

FIG. 8 depicts a flow chart 800 of a method of configuring a router 100 according to embodiments of present invention. At block 802, one or more qubit signal distributors 108 (one qubit signal distributor 108 is illustrated but there can be multiple qubit signal distributors 108) and one or more readout signal distributors 110 (one readout signal distributor 110 is illustrated but there can be multiple readout signal distributors 110) are provided. At block 804, the qubit signal distributor 108 and the readout signal distributor 110 are configured to be separately connectable to quantum processors, as depicted in FIG. 2.

The qubit signal distributor 108 is configured to connect to a qubit input line 104 and the readout signal distributor 110 is configured to connect to a readout input line 106. The qubit signal distributor 108 and the readout signal distributor 110 require fewer qubit input and readout input lines compared to connecting to quantum processors 150 without the qubit signal and readout signal distributors.

A wideband diplexer 304 is connected to an input side of the qubit signal distributor 108 and the readout signal distributor 110. The wideband diplexer is configured to connect to a combination of a qubit input and readout input line 302 for receiving both qubit input signals (needed to drive the qubits in the quantum processor 150) and readout input signals (needed to drive the readout resonators in the quantum processor 150).

FIG. 9 is a flow chart 900 of a method for a router 100 according to embodiments of the present invention. At block 902, qubit signals are received by a qubit signal distributor 108. At block 904, readout signals are received by a readout signal distributor 110. At block 906, the qubit signals and the readout signals are distributed by qubit signal distributor 108 and readout signal distributor 110 to quantum processors 150.

Distributing the qubit signals and the readout signals to the quantum processors 150 includes distributing the qubit signals and the readout signals to the diplexers 112_1 through 112_M from both the qubit signal distributor 108 and the readout signal distributor 110 such that the diplexers 112 provide the qubit signals and the readout signals to the quantum processors. A combination of the qubit signals and the readout signals are received by a wideband diplexer 304, such that the wideband diplexer 304 distributes the qubit signals to the qubit signal distributor 108 and distributes the readout signals to the readout signal distributor 110.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to superconducting device and integrated circuit (IC) fabrication may or may not be described in detail herein. By way of background, however, a more general description of the superconducting device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor or superconducting device according to the present invention utilize a variety of individually known physical and chemical processes performed on a superconducting over a dielectric (e.g., silicon) substrate, some of which are described in the immediately following paragraphs.

In general, the various processes used to form a microchip that will be packaged into an IC fall into general categories, including, film deposition, removal/etching, and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Films of both conductors (e.g., poly-silicon, aluminum, copper, etc.) and insulators (e.g., various forms of silicon dioxide, silicon nitride, etc.) are used to connect and isolate components. Lithography is the formation of three-dimensional relief images or patterns on the semiconductor substrate for subsequent transfer of the pattern to the substrate. In lithography, the patterns are formed by a light sensitive polymer called a photo-resist. To build the complex structures of a circuit, lithography and etch pattern transfer steps are repeated multiple times. Each pattern being printed on the wafer is aligned to the previously formed patterns and slowly the conductors, insulators and other regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A router comprising:
   a qubit signal distributor;
   a readout signal distributor; and
   diplexers communicatively coupled to the qubit signal distributor and the readout signal distributor.

2. The router of claim 1, wherein the qubit signal distributor is configured to be communicatively coupled to a qubit input line.

3. The router of claim 1, wherein the readout signal distributor is configured to communicatively couple to a readout input line.

4. The router of claim 1, wherein the diplexers are configured to communicatively couple the qubit signal distributor and the readout signal distributor to quantum processors.

5. The router of claim 1, wherein the qubit signal distributor and the readout signal distributor require fewer qubit input and readout input lines communicatively coupled to quantum processors than without use of the qubit signal and readout signal distributors.

6. The router of claim 1, further comprising a wideband diplexer communicatively coupled to an input side of the qubit signal distributor and the readout signal distributor.

7. The router of claim 6, wherein the wideband diplexer is configured to communicatively couple to a combination qubit input and readout input line.

8. A method of configuring a router, the method comprising:
providing a qubit signal distributor and a readout signal distributor; and
configuring diplexers to be communicatively coupled to the qubit signal distributor and the readout signal distributor.

9. The method of claim 8, wherein the qubit signal distributor is configured to communicatively couple to a qubit input line.

10. The method of claim 8, wherein the readout signal distributor is configured to communicatively couple to a readout input line.

11. The method of claim 8, wherein the diplexers are configured to communicatively couple the qubit signal distributor and the readout signal distributor to quantum processors.

12. The method of claim 8, wherein the qubit signal distributor and the readout signal distributor require fewer qubit input and readout input lines compared to communicatively coupling to quantum processors without the qubit signal and readout signal distributors.

13. The method of claim 8, wherein a wideband diplexer is configured to be communicatively coupled to an input side of the qubit signal distributor and the readout signal distributor.

14. The method of claim 13, wherein the wideband diplexer is configured to connect to a combination qubit input and readout input line.

15. A router comprising:
a qubit signal distributor; and
a readout signal distributor, wherein the qubit signal distributor and the readout signal distributor are each communicatively coupled to respective quantum processors.

16. The router of claim 15, wherein:
the qubit signal distributor is configured to communicatively couple to a qubit input line; and
the readout signal distributor is configured to communicatively couple to a readout input line.

17. The router of claim 15, wherein the qubit signal distributor and the readout signal distributor require fewer qubit input and readout input lines communicatively coupled to the quantum processors than without use of the qubit signal and readout signal distributors.

18. The router of claim 15, further comprising a wideband diplexer communicatively coupled to an input side of the qubit signal distributor and the readout signal distributor, wherein the wideband diplexer is configured to communicatively couple to a combination qubit input and readout input line.

19. A method of configuring a router, the method comprising:
providing a qubit signal distributor and a readout signal distributor; and
configuring the qubit signal distributor and the readout signal distributor to be separately connectable to respective quantum processors.

20. The method of claim 19, wherein:
the qubit signal distributor is configured to communicatively couple to a qubit input line; and
the readout signal distributor is configured to communicatively couple to a readout input line.

21. The method of claim 19, wherein the qubit signal distributor and the readout signal distributor require fewer qubit input and readout input lines communicatively coupled to the quantum processors than without use of the qubit signal and readout signal distributors.

22. The method of claim 19, wherein:
a wideband diplexer is communicatively coupled to an input side of the qubit signal distributor and the readout signal distributor; and
the wideband diplexer is configured to communicatively couple to a combination qubit input and readout input line.

23. A method for a router, the method comprising:
receiving qubit signals by a qubit signal distributor;
receiving readout signals by a readout signal distributor; and
distributing the qubit signals and the readout signals to quantum processors.

24. The method of claim 23, wherein distributing the qubit signals and the readout signals to the quantum processors comprises distributing the qubit signals and the readout signals to diplexers from the qubit signal distributor and the readout signal distributor such that the diplexers provide the qubit signals and the readout signals to the quantum processors.

25. The method of claim 23 further comprising receiving a combination of the qubit signals and the readout signals by a wideband diplexer such that the wideband diplexer distributes the qubit signals to the qubit signal distributor and distributes the readout signals to the readout signal distributor.

* * * * *